United States Patent [19]

Arnold et al.

[11] Patent Number: 4,693,111

[45] Date of Patent: Sep. 15, 1987

[54] POSITION SENSOR FOR A MOVABLE PART IN A MOTOR VEHICLE

[75] Inventors: Herbert Arnold, Eberdingen; Walter Bosch, Waiblingen; Michael Horbelt; Wolfgang Maisch, both of Schwieberdingen; Hermann Nusser, Markgröningen; Klaus-Jürgen Peters, Affalterbach; Peter Werner, Wiernsheim; Clemens Willke, Ditzingen, all of Fed. Rep. of Germany

[73] Assignee: Robert Bosch GmbH, Stuttgart, Fed. Rep. of Germany

[21] Appl. No.: 775,757

[22] Filed: Sep. 13, 1985

[30] Foreign Application Priority Data

Sep. 13, 1984 [DE] Fed. Rep. of Germany ....... 3433585

[51] Int. Cl.$^4$ .......................................... G01M 15/00
[52] U.S. Cl. .................................. 73/118.1; 338/120; 338/132; 338/172
[58] Field of Search ..................... 323/367; 338/89, 91, 338/123, 129, 132, 172, 117, 120, 128; 73/118.1, 118.2; 33/DIG. 21

[56] References Cited

U.S. PATENT DOCUMENTS

| | | | |
|---|---|---|---|
| 2,119,195 | 5/1938 | Bagno | 338/132 X |
| 2,938,184 | 5/1960 | Mayer | 338/89 |
| 4,406,161 | 9/1983 | Locke et al. | 73/118.2 |
| 4,526,042 | 7/1985 | Yamazoe et al. | 73/118.2 X |

*Primary Examiner*—Jerry W. Myracle
*Attorney, Agent, or Firm*—Walter Ottesen

[57] ABSTRACT

A sensor is disclosed for detecting the position of a movable part in a motor vehicle with a common drive for several position pickups and several paths. The individual paths are traversed at least partly consecutively over the total range so that a position signal with different resolution depending on the path can be made available. This is accomplished by means of individual paths corresponding to different places in the total range. The paths are in the form of resistance paths. The signals picked up can then be associated with electrically different paths for further processing. Paths having the same resolution are also possible.

10 Claims, 4 Drawing Figures a)

b)

a)

POSITION SENSOR FOR A MOVABLE PART IN A MOTOR VEHICLE

BACKGROUND OF THE INVENTION

The invention relates to a sensor for detecting the position of a movable part in a motor vehicle with a common drive for several position pickups and several path ranges according to German Utility Model Registration DE-GM No. 71 20 684. A step-variable resistor for use as a throttle flap position sensor is disclosed in DE-GM No. 71 20 684. It is essential in this arrangement that a housing on a single circuit board includes two electrically insulated potentiometer circuits and that each of these two circuits has a slider secured to a shaft of the variable resistor. This arrangement makes it possible to obtain two different characteristics over the entire range of the respective potentiometers, which characteristics are, in turn, suitable for different uses.

German Published Patent Application DE-OS No. 24 42 373 discloses an electrically controlled intermittently operating fuel injection arrangement having its injection signal generated on the basis of rotational speed and throttle flap position. In this arrangement, the throttle flap position is sensed by means of a potentiometer. With a view to accomplishing optimum metering of fuel, it is necessary to detect the throttle flap position very accurately in the range of relatively small opening angles of the throttle flap, that is, in the lower load range. Compared with higher load ranges, this requires a higher resolution in the lower load range.

It has been shown now that in some cases the detection of a potentiometer voltage using conventional 8-bit analog-to-digital converters is insufficient with respect to the relative resolution. In particular at small angles of opening, quantization effects a high surge per increment.

It is known to accomplish different resolutions using potentiometers having non-linear characteristics such as a logarithmic characteristic, for example. Large-scale production of such potentiometers is, however, problematical with respect to their exact reproducibility; moreover, the adjustment of such potentiometers in the motor vehicle causes accuracy problems.

SUMMARY OF THE INVENTION

Therefore, it is an object of the invention to provide a position sensor which is simple to manufacture and permits a high and also a different resolution in the individual load ranges with relative ease.

The position sensor of the invention accomplishes this object by permitting the detection of positions over a total range at a high and also different rate of resolution and is relatively easy to produce.

Further advantages of the invention will become apparent from the subsequent description of embodiments in conjunction with the drawing.

BRIEF DESCRIPTION OF THE DRAWING

The invention will now be described with reference to the drawing wherein.

DESCRIPTION OF THE PREFERRED EMBODIMENTS OF THE INVENTION

Figure 1:
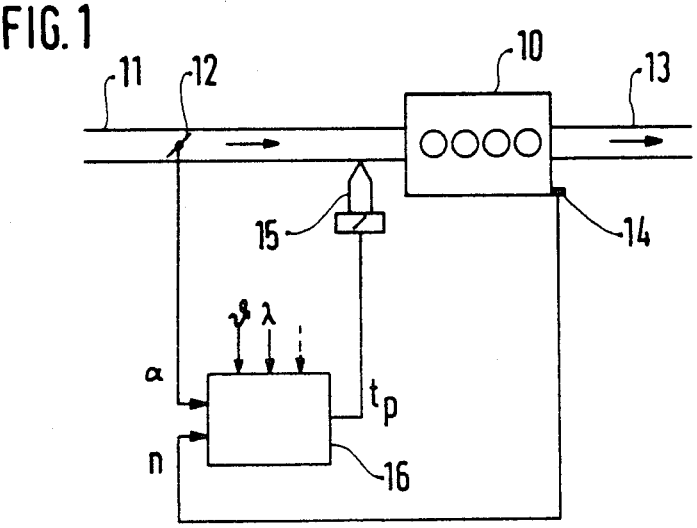
FIG. 1 is a schematic view of an electronically controlled injection arrangement processing the throttle flap position and the rotational speed as the most important operating characteristics.

FIG. 1 shows the basic configuration of an electrically controlled and preferably intermittently operating fuel injection arrangement which is based on signals indicative of the rotational speed and the angular position of the throttle flap. An arrangement of this type is known, for example, from DE-OS No. 24 42 373 initially referred to.

An internal combustion engine 10 receives intake air through an intake pipe 11 accommodating a throttle flap 12. At the other end of the engine is an exhaust pipe 13. A rotational speed sensor 14 detects the instantaneous rotational speed (n) of the crankshaft and determines, together with the angular position ($\alpha$) of throttle flap 12, an injection signal $t_p$ for an injection valve 15 arranged with respect to intake pipe 11. In addition to rotational speed and throttle position, further inputs applied to the electronic injection control unit 16 are, as a rule, such operating characteristics as temperature and Lambda, for example, as shown in FIG. 1.

The angles of opening of the throttle flap 12 differ depending on the load range of the internal combustion engine. The reaction of the internal combustion engine in the range of small angles of opening of the throttle flap is more sensitive than at large angles of opening so that it is necessary to select a higher resolution of the angle of opening in the lower load range than in the upper load range.

Figure 2:
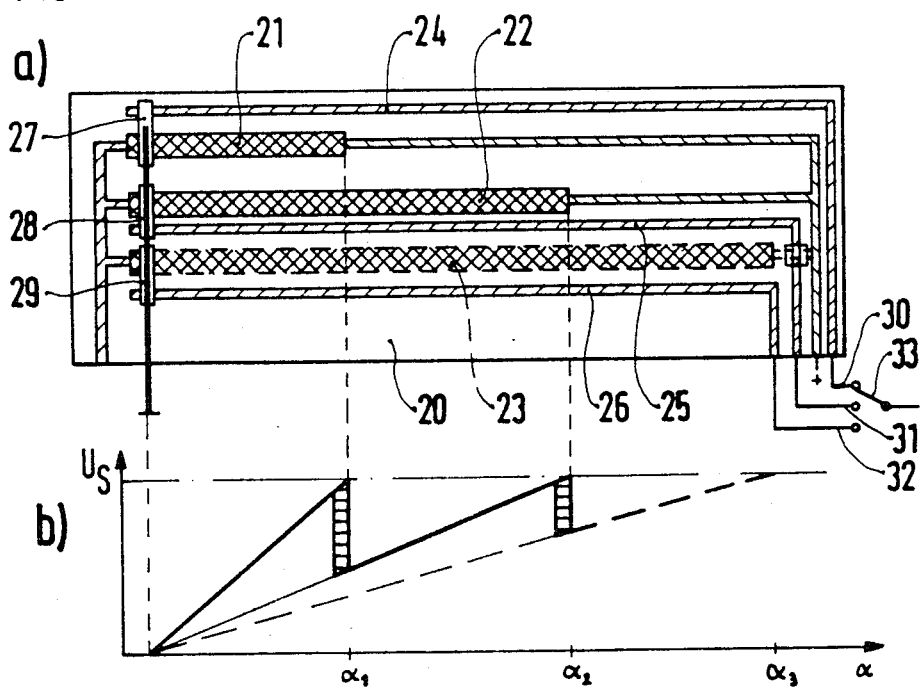
FIG. 2 (including parts a and b) is an embodiment of a position sensor of the invention including several individual paths or ranges issuing from a common starting point.

FIG. 2 shows an embodiment of a position sensor for the throttle flap 12 of FIG. 1 in linear representation.

Referring now to FIG. 2a, a common substrate 20 supports three resistance paths 21, 22 and 23 having three respective slider paths 24, 25 and 26 as well as three respective sliders 27, 28 and 29 coupled with a common drive (not shown). The three resistance paths define three potentiometers the output signals of which can be taken off conductive leads 30 to 32 via respective conductive paths 24 to 26. The individual signals can be selected for further processing by means of a switch 33.

An importmant feature in this arrangement is that the total voltage applied drops along the individual path ranges of resistance paths 21 to 23, so that over the total path range the signal shown in FIG. 2b will result. Since the performance of the individual resistance paths 21 to 23 is linear, straight lines with different slopes result, the lines starting from a point corresponding to the common lefthand stop.

While FIG. 2a shows three resistance paths, it is to be understood that the invention may be generalized by providing a plurality of individual paths which in the simplest embodiment can be two.

When a resistance path reaches or approaches its right end, this condition will be detected by electrical means, and switch 33 will be switched correspondingly. This results ultimately in the signal path drawn in a thick line in FIG. 2b which reflects different resolutions in the individual path ranges.

Figure 3:
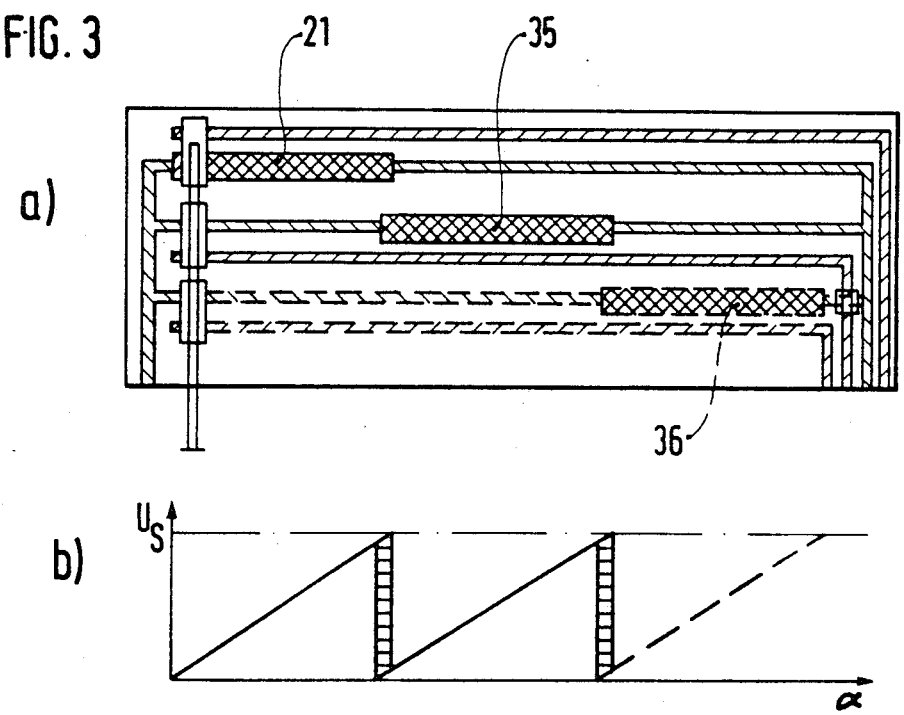
FIG. 3 (including parts a and b) is another embodiment of a position sensor wherein individual ranges are distributed over the total range; and, FIG. 4 (including parts a–d) is a view of a position sensor for a rotary motion, including two individual, staggered paths.

FIG. 3 is a modification of the embodiment of FIG. 2 to the effect that the individual resistance paths do not start at the same drive position but are staggered relative to each other. In the embodiment of FIG. 3, the second resistance path 35 thus starts at the end of, or in a specific overlapping region with, resistance path 21, and a further resistance path 36, if any, starts where the preceding resistance path 35 ends.

FIG. 3b shows a saw-tooth signal pattern for the entire configuration of FIG. 3a with a very high resolution in all ranges. Modifications to the embodiments of FIGS. 2 and 3 are, of course, possible by assigning specific functions to the individual resistance paths. It is only essential for the individual sliders to have different ranges of effectiveness. The sliders connect respective resistance paths 21 to 23 to their respective conductors 24 to 26. In this arrangement, these sliders may also be adapted to cover the extension of resistance paths 21 and 22 or 35 without influencing the signals.

Figure 4:
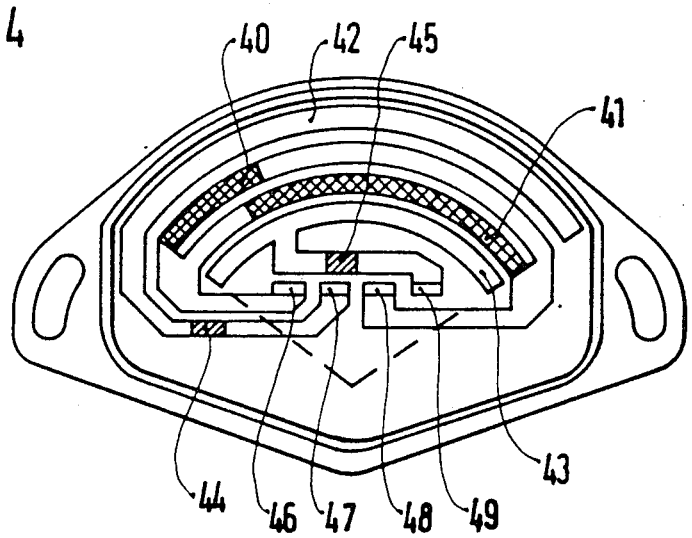
Figure 4:
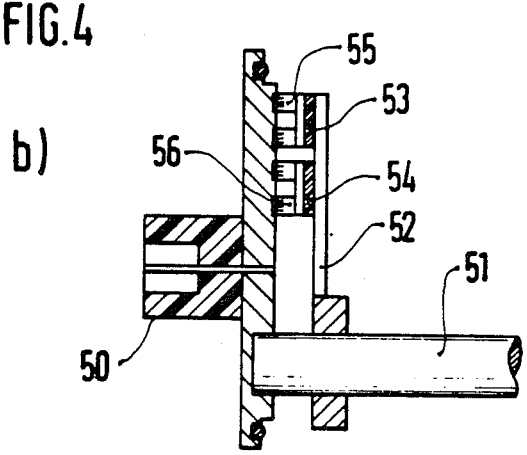
Figure 4:
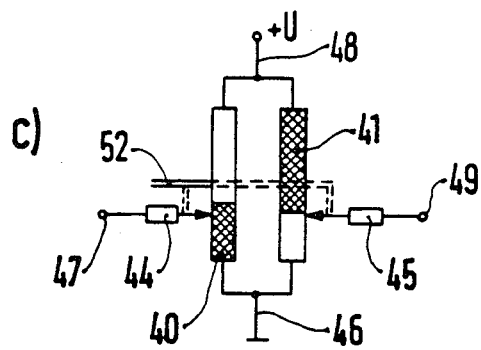
Figure 4:
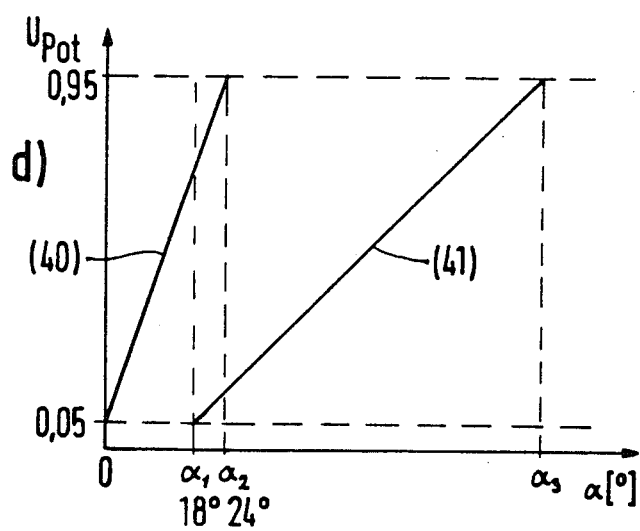

FIG. 4 illustrates a hardware representation of a throttle flap potentiometer according to the principle of FIG. 3, that is, the individual resistance paths are staggered one with respect to the other.

In the throttle flap potentiometer of FIGS. 4a and 4b, two resistance paths 40 and 41 are arranged so as to be staggered with respect to each other within a specific displacement angle of a drive 51 (FIG. 4b). The remaining ranges of the resistance paths, that is, their supplements to the full displacement angle, have their undersides silverplated. Therefore, a signal picked up there is independent of position.

The slider paths corresponding to the two resistance paths 40 and 41 are identified by reference numerals 42 and 43. The slider paths 42 and 43 are connected to the four terminals 46 to 49 via respective resistors 44 and 45 and conducted out of the capsule enclosing the throttle flap potentiometer to a four-pole plug 50. Four-pole plug 50 is illustrated in the sectional view of FIG. 4b. FIG. 4b also shows a throttle flap shaft 51 and a control lever 52 which is fixedly attached to the throttle flap shaft. Sliders 55 and 56 are connected to the control lever 52 via respective insulating plates 53 and 45. The sliders 55 and 56 connect resistance paths 40 and 41 with slider paths 42 and 43, respectively.

FIG. 4c shows the equivalent circuit diagram of the arrangement of FIG. 4a, wherein like components have been assigned like reference numerals. It includes essentially two potentiometer paths connected in parallel with resistance ranges staggered with respect to each other and a common drive 52.

FIG. 4d illustrates the electric signal behavior of the potentiometer of FIG. 4a. According to FIG. 4d, the first resistance path 40 acts in the angular range of $0 \leq \alpha \leq \alpha_2$, while the second resistance path 41 acts in the range of $\alpha_1 \leq \alpha \leq \alpha_3$. Since the two resistance paths 40 and 41 are of different lengths, the slopes and therefore the voltage gradients will also differ over an angular increment depending on the angular range involved. In this respect, the embodiment of FIG. 4 is a combination of the embodiments of FIGS. 2 and 3 because the potentiometer of FIG. 4 is based on different initial values, while at the same time providing different slopes.

The field of application of the position sensor of the invention is not to be construed as being limited to the sensing of the throttle flap position but may be used wherever it is desired to detect a position over the entire value range with different resolutions and to make use of substantially linear-acting individual potentiometers.

It is understood that the foregoing description is that of the preferred embodiments of the invention and that various changes and further modifications may be made thereto without departing from the spirit and scope of the invention as defined in the appended claims.

What is claimed is:

1. A position detecting device for detecting the position of a movable part over a total range of movement, the device comprising:

a plurality of position pick-ups for picking up a position signal;

a plurality of paths corresponding to respective ones of said pick-ups, said paths being arranged so as to be mutually adjacent and having respectively different lengths over said range so as to conjointly define respective sub-ranges;

a single drive common to all of said pick-ups for simultaneously driving the latter over respective ones of said paths so as to pass sequentially through said sub-ranges; and, said pick-ups being driven over said paths to engage corresponding ones of said paths at respective times during the movement of said pick-ups over said range thereby providing a variant resolution of said position signal at corresponding ones of said sub-ranges.

2. The position detecting device of claim 1, wherein said device is utilized as a throttle flap position sensor.

3. A position detecting device for detecting the position of a movable part over a total range of movement, the device comprising:

a plurality of position pick-ups for picking up a position signal;

a plurality of paths corresponding to respective ones of said pick-ups and extending in a predetermined direction;

a plurality of conductors adjacent respective ones of said paths, each two mutually adjacent ones of said paths and said conductors defining a circuit pair corresponding to one of said pick-ups;

a single drive common to all of said pick-ups for simultaneously driving respective ones of said pick-ups over corresponding ones of said pairs; and, said plurality of paths being staggered in said direction one with respect to the other so as to be at least partially traversed sequentially over said total range.

4. The position detecting device of claim 3, comprising voltage supply means for applying a common voltage across all of said paths.

5. The position detecting device of claim 3, said paths having respectively different lengths.

6. The position detecting device of claim 3, said paths being displaced one with respect to the other.

7. The position detecting device of claim 6, said paths having respective segments mutually adjacent so as to cause said paths to overlap each other.

8. The position detecting device of claim 3, wherein variant functions of said output signal dependent on the particular position are obtainable by means of the individual paths.

9. A position detecting device for detecting the position of a movable part in a motor vehicle over a total range of movement, the device comprising:

a plurality of position pick-ups for picking up a position signal;

a plurality of paths corresponding to respective ones of said pick-ups and having respective predetermined resolutions;

a plurality of conductors adjacent respective ones of said paths, each two mutually adjacent ones of said paths and said conductors defining a circuit pair corresponding to one of said pick-ups;

a single drive common to all of said pick-ups for simultaneously driving respective ones of said pick-ups over corresponding ones of said pairs; and, said paths extending over respective distances in said range so as to cause respective ones of said pick-ups to have respectively different ranges of effectiveness.

10. The position detecting device of claim 9, said plurality of paths being staggered one with respect to the other so as to cause said position signal to have a high resolution over the entire range.

* * * * *